United States Patent [19]

Coronel

[11] Patent Number: 5,259,823
[45] Date of Patent: Nov. 9, 1993

[54] TRANSMISSIONS

[76] Inventor: Paul K. Coronel, c/o Mr. Walter Kay, 796 Isenberg St., Suite PH-20L, Honolulu, Hi. 96826

[21] Appl. No.: 592,551

[22] Filed: Oct. 1, 1990

Related U.S. Application Data

[63] Continuation-in-part of Ser. No. 37,596, Apr. 13, 1987, abandoned, and a continuation-in-part of Ser. No. 307,483, Feb. 6, 1989.

[51] Int. Cl.$^5$ .................... F16H 1/42; F16H 37/08
[52] U.S. Cl. ..................... 475/257; 475/330
[58] Field of Search ............. 475/254, 257, 323, 330

[56] References Cited

U.S. PATENT DOCUMENTS

| | | | |
|---|---|---|---|
| 2,668,459 | 2/1954 | Berklege | 475/254 |
| 3,130,606 | 4/1964 | Kreis | 475/254 |
| 4,700,589 | 10/1987 | Coronel | 475/6 |

FOREIGN PATENT DOCUMENTS

| | | | |
|---|---|---|---|
| 698025 | 11/1930 | France | 475/323 |
| 52-63553 | 5/1977 | Japan | 475/323 |

Primary Examiner—Rodney H. Bonck
Assistant Examiner—Ryan W. Massey

[57] ABSTRACT

A series of all-geared, positive drive, stepless, shift-free exponential transmissions and geared neutral friction-free torque converters including two-stage and ultra high speed three-stage common axis and dual axis of rotation exponential mechanisms. Also included are combined transmissions/torque converting mechanisms and geared reversing attachments.

16 Claims, 8 Drawing Sheets

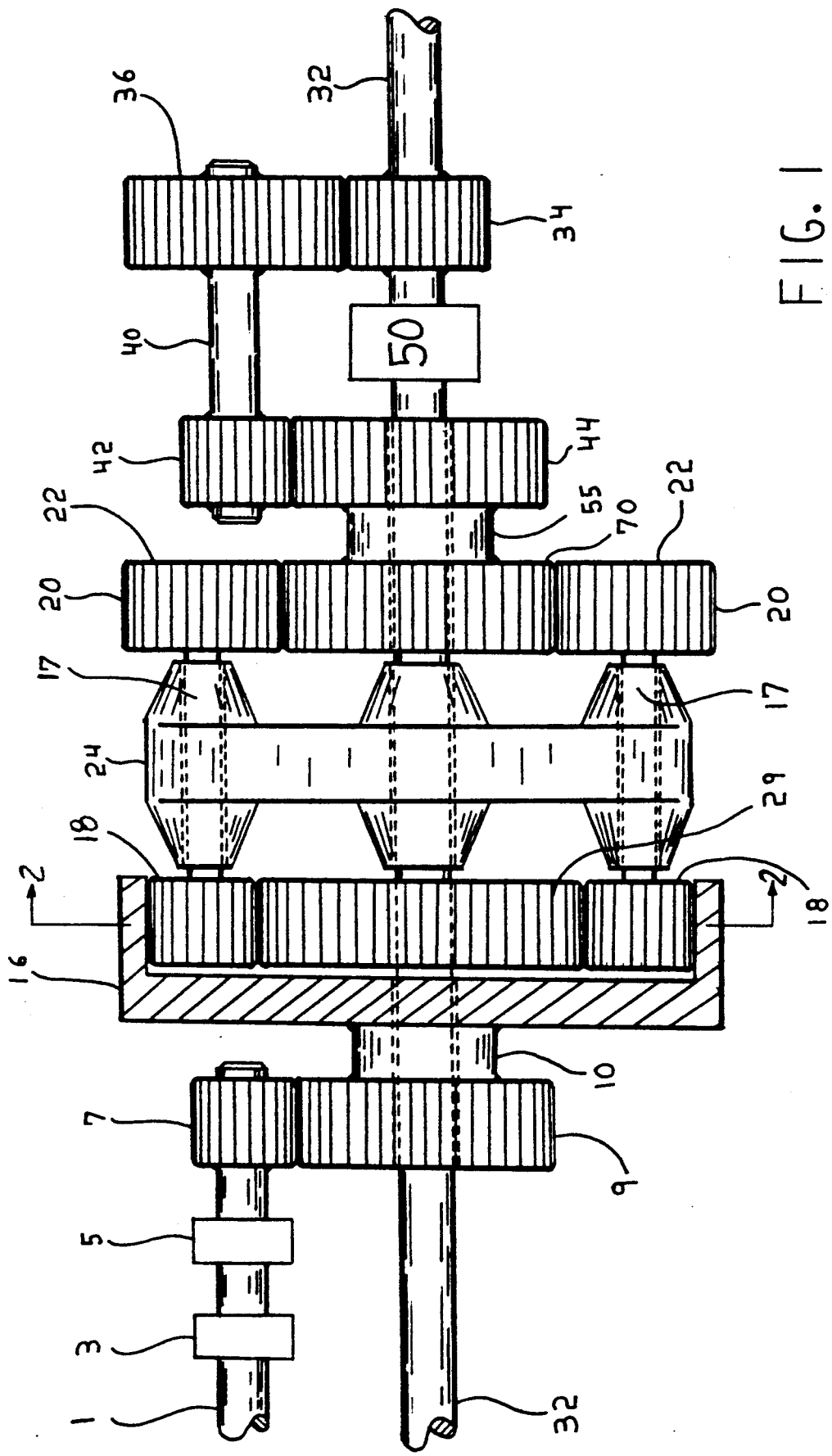

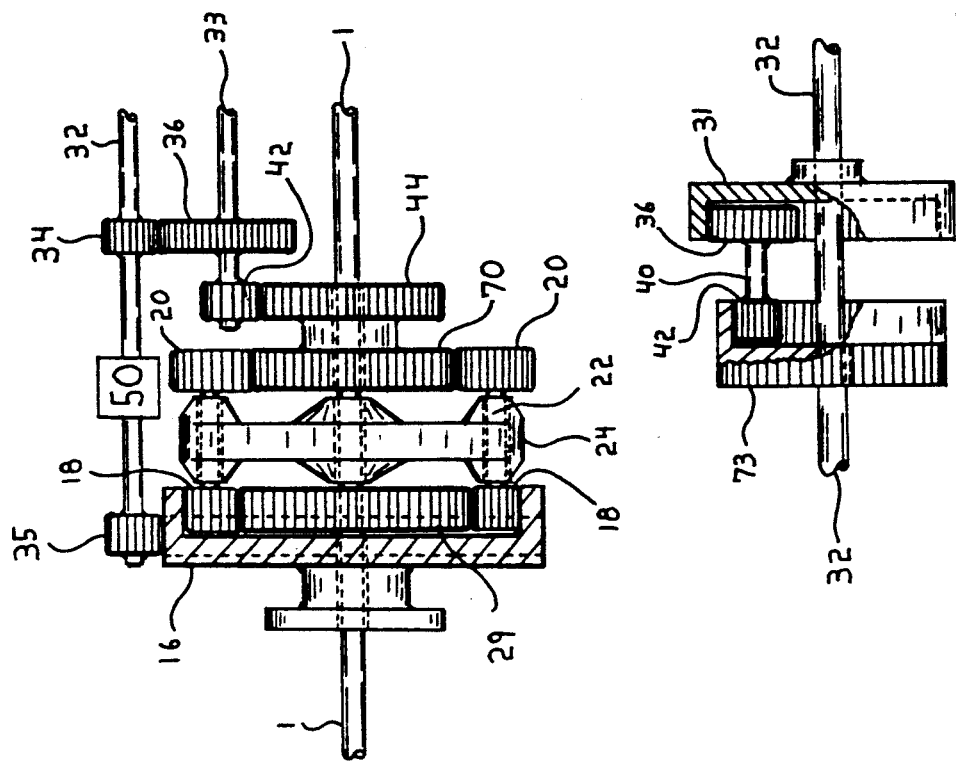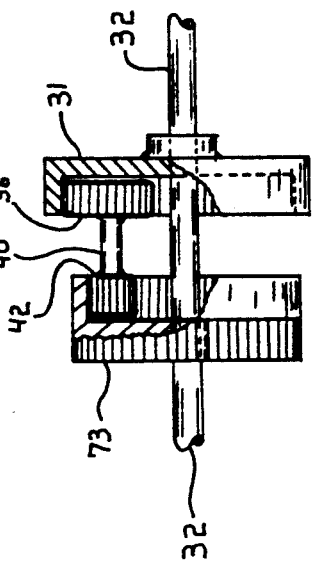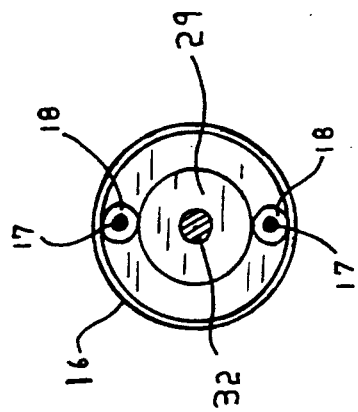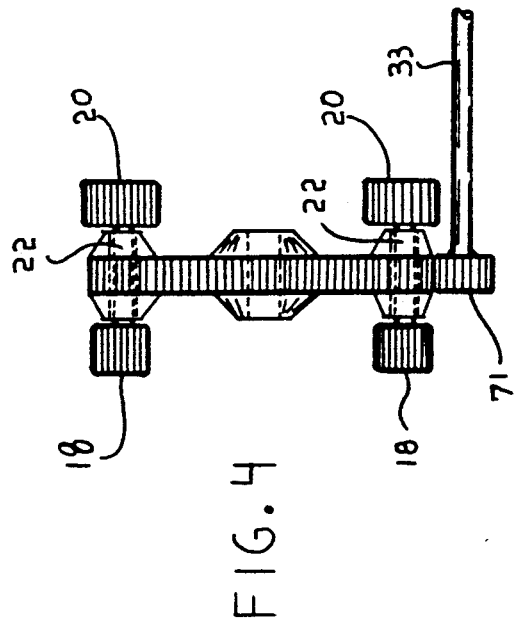

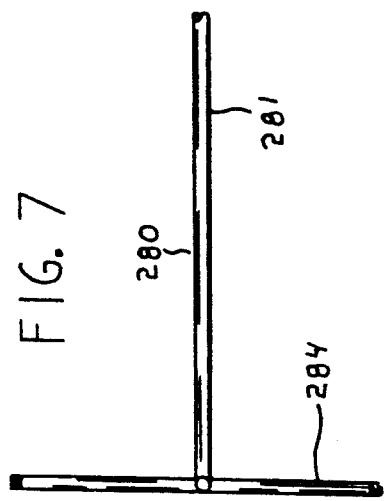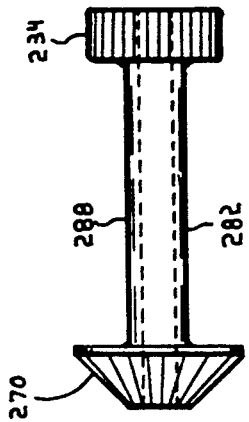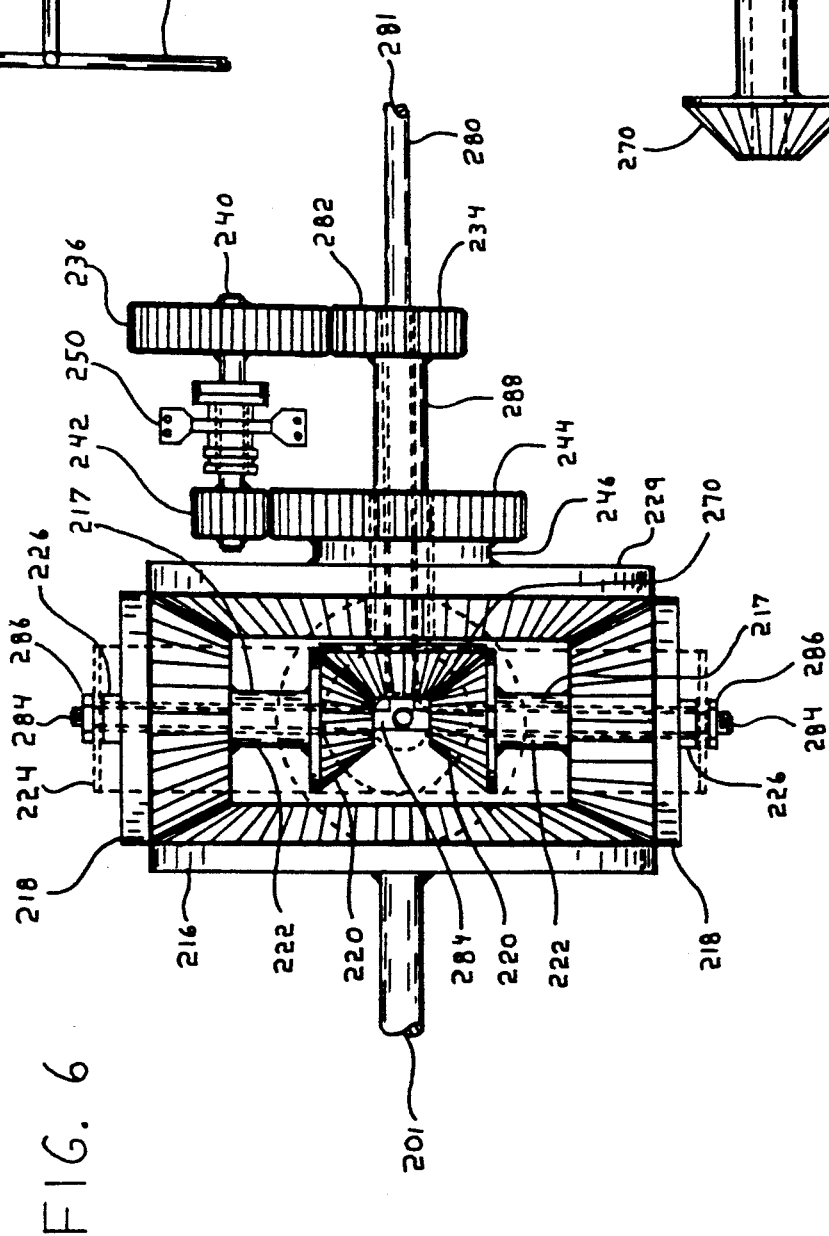

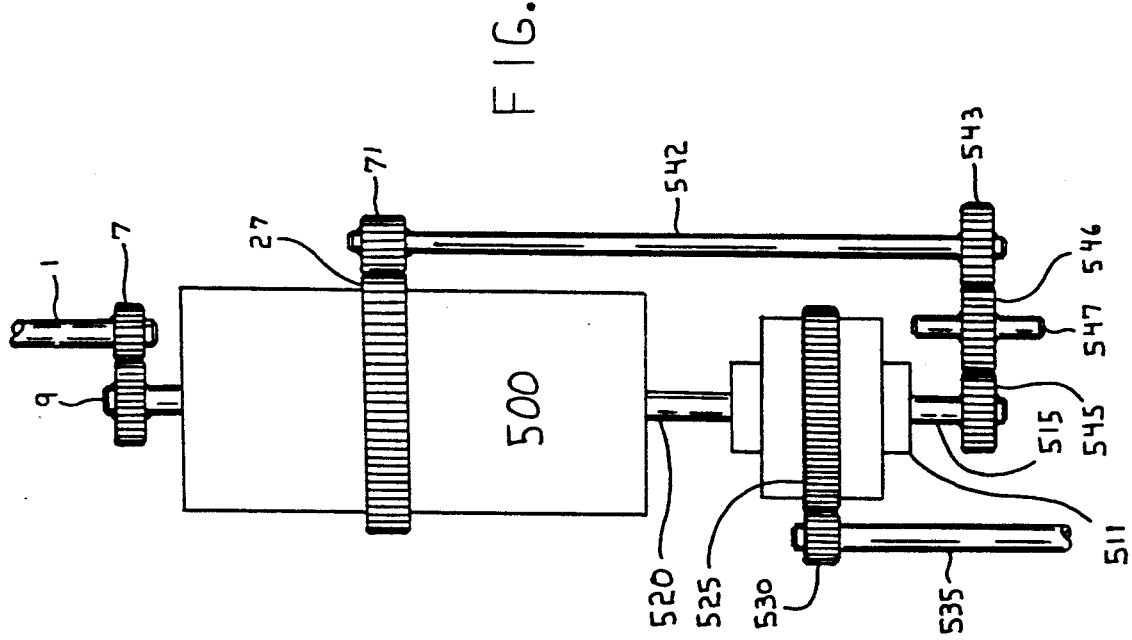

TRANSMISSIONS

BACKGROUND OF THE INVENTION

This application for the Common Axis of Rotation Exponential Transmission and related Frictionless Clutching Mechanism is a continuation-in-part of my prior applications (1) Ser. No. 07/037,596 filed on Apr. 13, 1987, now abandoned; and (2) Ser. No. 307,483 filed on Feb. 6, 1989 and co-pending.

This application for the additional classes of exponential transmissions, positively infinitely variable transmissions, and related mechanisms is a continuation-in-part of my prior application Ser. No. 307,483 filed on Feb. 6, 1989 and co-pending.

BRIEF SUMMARY OF THE DISCLOSURE

The present patent discloses a series of new trochilic classes of all-gear, positive drive, stepless transmissions and friction-free torque converters. The initial class includes two and three stage common axis and dual axis of rotation exponential mechanisms which progressively loop and compound input rotary motion. This class utilizes rotational motion input into the mechanism to drive internal gearing to produce an initial stage rotational product. The results are next looped back into the gearing through a second stage of the mechanism to compound or expand the rotating motion for output. While producing rapidly expanding velocity, these transmissions rely upon accelerations of input velocity to actuate the exponentially expanding mechanisms. U.S. Pat. No. 4,700,589, the pioneer patent granted in late 1987 for exponential transmissions, is a dual axis mechanism and friction-free torque converting device which initiated the generation of classes. This disclosure expands this class with additional mechanisms.

The second class of stepless transmissions disclosed utilizes rotating framework carriers to drive compounding gearing around rotating gearing to reduce the number of gears and other components necessary to accomplish the exponential rotational expansion. This class also contains common axis and dual axis of rotation versions. Later included examples of this class incorporate constant velocity universal joints to substantially reduce the gearing and ancillary components necessary to accomplish design goals of simplicity.

A third class introduces a new trochilic mechanism gear principle utilizing a trochidal circumvolving orbiting carrier to produce rotational amplification and labled the "Coronel Effect". This effect results from mechanism gears connected directly to their driving axles through constant velocity universal joints to enable the driving of an angled gear edge independently of the gear's rotational velocity. When in contact with a smaller gear rotating at the same axis of the driver axle, the canted circumvolving gear angle can drive the smaller gear independently and additionally to the rotating driver gear. This effect is utilized to produce exponentially compounding transmissions and a linear motion to rotary motion converter.

A fourth class introduces user actuated, all geared, bidirectional, torque converting, braking, positively infinitely variable transmissions which utilize an externally actuated control to inject or extract rotary motion to produce a forward or reversed direction torque converting output from a stopped central position.

The disclosure also includes a new planetary gear set, a class of rotary motion injectors, a continuously engaged on/off road vehicular four-wheel-drive drive train utilizing one differential.

These disclosures show the mechanism working components and not their supporting structures. These disclosures do not attempt to establish any specific gear ratios. Such ratios will vary in accordance with the application of the mechanism.

The principle objective of the invention is to provide a continuously engaged drive train utilizing all-geared, step-free, non-shifting mechanisms to replace conventional manual and automatic shifting transmissions, torque converters, transfer case mechanisms and locking hubs (with 4WD vehicles). Continuously engaged power transmissions reduce fuel consumption and component wear while improving operational safety and reliability.

A secondary objective of the invention is to perfect the non-shifting exponential transmission and disclose the torque converting, bidirectional, positively infinietly variable transmissions, all within various arrangements for vehicular and industrial applications. In addition to terrestrial applications, the mechanisms are ideally suited for previously unfeasible marine applications which are unable to utilize optimum power or obtain potential economy during the full range of operating speeds.

The gear ratios depicted in the drawing figures are not to be construed as delimiting in describing the operational principles of the disclosures and may vary in accordance with the written specification.

STATEMENT OR PRIOR ART

Book II of a treatise entitled "Mechanica" generally attributed to Nero of Alexandria and believed to have been written between A.D. 50 and A.D. 120 (translated from original text which no longer exists by Costa Ben Luka in mid-ninth century) contains a detailed description of a worm and pinion reduction gear set. This would be the first historical recording of the invention of a positive power transmitting gear set.

Archaeological evidence shows that the first actual use of gears were employed in milling with water wheels as power sources. These originated in the third or fourth century A.D. and comprised a tooth wheel driving another toothed wheel prior to the structural improvement of the lantern wheel. The purpose of its development was to direct power at an angle and/or direction unobtainable with direct drive.

The fourth century A.D. Latin work entitled "Anonymus De Rebus Bellicis" contains a description of a oxen powered paddle wheel ship believed to utilize a crown wheel and a pinion to convert horizontal animal circling to vertical paddle wheel rotation. While probably never constructed, this represents the first proposed use of gears to actuate vehicular propulsion.

Simple gear trains continued to transmit motive power in the form of rotational angular velocity. These single speed "transmissions" utilized different ration gear sets to amplify or reduce the rotational rate within corresponding changes of the working power (torque). This basic transmission remained unimproved into the industrial revolution. During the industrial revolution new demands including machine tools compelled the capability of changable speed ranges. Initial speed change mechanisms employed belt drive mandrels of different sizes. The belt would be moved to the appropriate size to produce the desired speed.

The early 1800's saw the introduction of the first practical non-rail self-propelled steam vehicles and tractors. These combersome vehicles relied upon a reduction gear train and a variable pressure throttle to propel them throughout their speed range.

With advances in electric ignition in the early 1900's came the first gasoline internal combustion automobiles. Soon engine advances produced sufficient power capability to drive the vehicle beyond the limitations inherent with one fixed speed range. To expand the vehicular speed range, a variety of devices were invented taking the form of (1) non-gear infinitely variable friction devices, and (2) shifting sets of gears with different rations. Both forms experienced substantial inherent operational friction to some degree. Induced friction was continuous in the infinitely variable devices and was necessary to maintain contact between driving and driven surfaces. These devices included reversed cones, twin disks, etc. Friction was temporary in the multiple gear set speed change mechanisms and confined to moments of motive commencement and speed range changes where bands and clutches provided the temporary friction inducing slippage necessary for smooth speed range transitions. Since the latter tended to possess a longer wearing life than the infinitely variable devices and were cheaper and easier to replace, they eventually prevailed, although the infinitely variable devices experienced occasional renaissance with improvements in materials technology.

Continued improvements in motor vehicle powerplants produced a vast variety of gear box designs with improved operation efficiency. However, all of the stronger non-infinitely variable devices presently utilize some form of friction torque conversion to actuate smooth transition between the multiple speed range gear sets. The more complex "automatic" transmissions utilize fluid torque converters and hydraulically operated clutch/band speed change brake actuators to dampen the negative effects of changing gear ratios. The presence of friction in the torque conversion clutching devices has never been eliminated or substantially reduced since their introduction. The intrinsic reality of substituting separate gear sets within one overall speed range compels the use of some form of friction inducing torque conversion during the shifting to a different ratio. Nor has a positive non-slipping alternative to fixed gear ratio sets been developed since their introduction 2,000 years ago until the granting of U.S. Pat. No. 4,700,589 in late 1987. Efforts to improve transmission design have been confined to reducing the undesirable effects of changing gear ratios and clutch seizure rather than seeking alternatives to these limitations.

U.S. Pat. No. 4,700,589 entitled "Coronel Radiant Drive Systems" introduced the geared non-shifting exponential transmission which presently recycles the product of an initial stage of rotational multiplication through a second stage to multiply the rotational product exponentially rather than linear. The patent further introduced a version of the transmission modified to perform as a friction-free torque converter. This geared device utilized bidirectional rotational motion to first cancel the initial transmission output produced with engine idling, and next to contribute to subsequent transmission output.

This disclosures continues the previous work with improvements to inventions as well as the introduction of new generations of devices replacing multiple speed gear boxes and friction inducing clutching mechanism.

The gear ratios between a set of two engaged gears is determined by their relative sizes. Two identically sized gears exert a ratio of 1:1. A smaller driving gear multiplies its torque while transferring it to a larger engaged gear rotating at a slower speed. Likewise, a larger driving gear reduces its driving torque while rotating a smaller driven gear at a faster speed.

Both the exponential and positively infinitely variable transmissions disclosed can also be described as continuously varying gear ratio transmissions which vary the mechanism geared ratios through variable rates of orbiting one or more gears around others during their transmitting of driving torque to vary the amount of torque multiplication occurring at any given speed of (1) geared torque transfer as varied by (2) gear orbiting.

In exponential transmissions, both the speed of torque multiplication and its varying gear orbiting are controlled by variation of the input speed. In positively infinitely variable transmissions, the input speed controls the torque multiplication while user actuation of the orbital speed controls the varying of the torque multiplication.

To achieve the positively infinitely variable mechanism, the creation of the rotational injector permitted a separate accelerable rotation input source to modify a fixed input speed by injection or extraction of rotary motion to create the all geared variable speed changing transmission. The creation of the directional compensating mechanism principle and its combination with the PIV produced the continuously engaged, bidirectional, torque converting, braking PIV.

The present disclosure combined with U.S. Pat. No. 4,700,589 contains a fairly accurate sequence of the development of the torque converting, bidirectional, braking, positively infinitely variable transmission. The concept originated with the efforts to produce a controllable dual concentric orbiting mechanism. The key to manually controlling (positively infinitely variable) such a device was found within the understanding the operational principles of the exponential transmissions.

BRIEF DESCRIPTION OF THE DRAWINGS

FIG. 1 is a side view of the common axis of rotation version of the bidirectionally-driven, recirculating-compounding, all-gear, progressively-accelerating transmission utilizing a ring gear for the first stage rotary multiplication.

FIG. 2 is a cross-section of the bidirectionally driving component arrangement of FIG. 1 at 2—2.

FIG. 3 is a side view of the transmission utilizing the central driver gear for the first stage multiplication.

FIG. 4 is a side view of the sustaining disk adapted as a frictionless clutch driver connected in a driving relation to the clutch output gear and output drive shaft.

FIG. 5 is an alternate driving arrangement for the multiplier gears which condition and transfer the second stage rotary multiplication product.

FIG. 6 is a side view of the arrangement of key components of the in-line radiant clutch mechanism showing the working components and not mounting and supporting structures.

FIG. 7 is a side view of the radiant transmitter showing the coupler axles attached to the output shaft.

FIG. 8 is a side view of the centrally bored second stage conditioning coupler.

FIG. 16 further shows an alternative method of utilizing an electric motor to drive a Positively Infinitely Variable Transmission actuating gear.

FIG. 17 shows a transmission with an interconnected idle speed compensating mechanism modified to utilize driven velocity from a sustaining disk or ring gear to compensate motor idle speed.

DETAILED DESCRIPTIONS OF THE INVENTIONS

Detailed Description of the Common Axis Transmission

During operation of the transmission, motor power is provided by rotating drive shaft 1 of FIG. 1. A clutch positioned between the motor and transmission, indicated at 3, separates the transmission when the motor type requires an idle speed to prevent the engine from stopping when the vehicle is not moving. The clutch may be of the frictionless type described in this disclosure.

Figure 10:
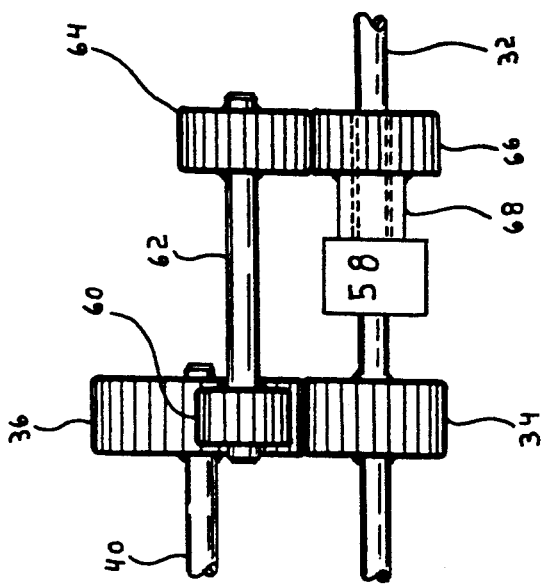
FIG. 10 is a side view of an alternate arrangement for a reverse drive mechanism for the common axis of rotation transmission.
Figure 9:
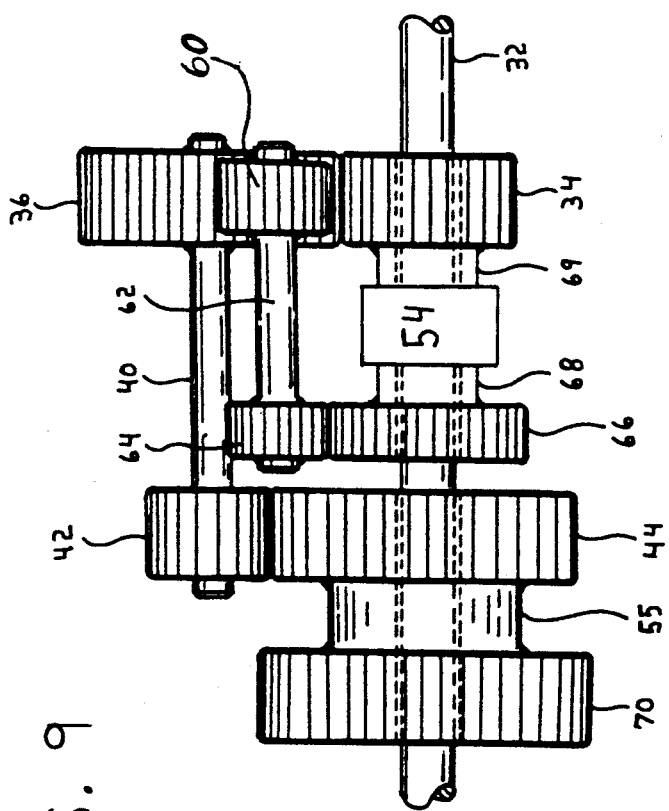
FIG. 9 is a side view of a reverse drive mechanism for the common axis of rotation transmission.
Figure 11:
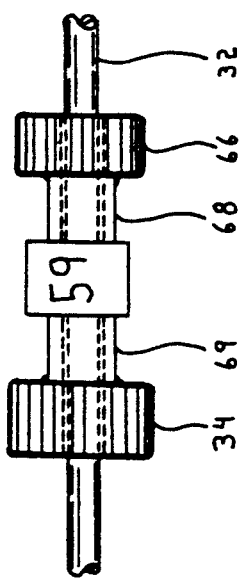
FIG. 11 is a side view of a portion of the reverse drive mechanism shown in FIG. 10. This portion shown an alternate forward-reverse actuating arrangement.

The reverse means 5, or those of FIGS. 9, 10, and 11 are utilized when the vehicle or machine is to be powered in a reverse direction without reversing the motor output direction.

During operation, the optional transmission gear driver 7 and reduction gear receiver 9 are cog wheels which mesh with each other to step down or slow motor input rotation and increase drive torque during transmission operation. Such reduction accommodates slower moving heavy vehicles such as trucks and tractors. In applications where increased drive torque provided by the step down is unnecessary, an ungeared direct engine coupling is utilized to drive light weight vehicles, aviation or marine propellers, high speed generators, or other similar applications.

Reduction gear receiver 9, connecting ring 10, and ring gear driver 16 are (a) attached together to create one unit (b) are centrally bored for free rotation about shaft 32. The edge flange of ring gear driver 16 contains cogs within the inner circumferential surface which mesh with and drive one or more first satellite pinions 18 as shown in FIGS. 1 and 2 to produce a first of two rotary multiplication product-producing stages which increase or expand the rotary motion input. The first satellite pinions 18 are rigidly connected to a second set of satellite pinions 20 with shaft 17. In this description, satellite pinions 20 are larger than satellite pinions 18. The transmission will function with satellite pinions 20 being smaller than satellite pinions 18, but with a reduction of the final exponential product. Each shaft 17 is rotatably connected for free rotation through sustaining disk 24. Sustaining disk 24 is mounted for free rotation upon drive shaft 32. The purpose of sustaining disk 24 is to provide correct spacing and structural support for couplers 22 to rotate (a) freely upon their individual axis of rotation and (b) as a unit concurrently orbiting around the central axis of rotation while transferring the combined first and second stage products to the output receiving gear 70.

Since the sustaining disk driver is only attached to the couplers 22 and main drive shaft 32, it is free to rotate around its own central axis when the first satellite pinions 18 are driven with differential driving velocities by driving ring 16 and central driver gear 29. This prevents gear lockup resulting from the concurrent, but differential driving velocities.

Output receiving gear 70 is mounted for free rotation about drive shaft 32, and is connected in a driven relationship with all second satellite pinions 20 of couplers 22. Thus couplers 22 transfer the first and second stage rotational products to receiving gear 70 when (a) driven rotationally about their individual axis by ring gear driver 16, and central driver gear 29 (b) driven orbitally concurrently about the central axis with sustaining disk 24.

First cog wheel 44 is rigidly connected to output receiving gear 70 with connecting ring 55 and shares the contiguous bore of receiving gear 70 and connecting ring 55 for free rotation about driveshaft 32. Fourth cog wheel 42 is rigidly connected to the first end of connecting axle 40 and further connected in a driving relation with the first cog wheel 44. Connecting axle 40 is mounted to the transmission frame in a manner permitting free rotation. Third cog wheel 36 is rigidly connected to the second end of connecting axle 40. Second cog wheel 34 is rigidly connected to one end of drive shaft 32, and connected in a driving relation to the third cog wheel 36. Drive shaft 32 freely rotates through the centers of (a) the first cog wheel 44, connecting ring 55, attached output receiving gear 70 and (b) sustaining disk 24. Drive shaft 32 is rigidly connected to the central driver gear 29. Drive shaft 32 next freely rotates through the first stage driver ring 16 and attached connecting ring 10, and gear 9. Thus, the second satellite pinions 20 transfer to the output receiving gear 70 an expanded rotational output rate determined by the combined first and second stage rotary multiplication products. The output receiving gear 70 next produces through the main drive shaft 32, second cog wheel 34, third cog wheel 36, the connecting axle 40, the fourth cog wheel 42, and the first cog wheel 44, a multiplier which creates a second stage rotary multiplication produce. This product establishes the rate of (a) rotation, (b) driving velocity for the central driver gear 29 which, in addition to the driving ring 16, concurrently drives the couplers 22 through their first satellite pinions 18. The satellite pinions 18 function as a common multiplicand when bidirectionally driven by both the driving ring 16 and the central driver gear 29.

During initial or slow speed transmission operation, motor input produces a low driving velocity for a low multiplication factor from the first stage. Increases in the input rate will increases (a) the second stage multiplier product, progressively expanding the compounding capability of the second stage and (b) the resulting combined sum of both stages, accelerating the transmission output. Compounding is defined as the looping or recirculation of the accelerating sums to produce greater sums and a concurrent exponential transmission output. Continued input acceleration progressively expands these results.

Located upon the main drive shaft 32 is a mechanism 50 which divides shaft 32 between the side attached to the second cog wheel 34 and the side attached to the second driver gear 29. In the alternative transmission arrangement shown in FIG. 3, mechanism 50 is located upon drive shaft 32 between fifth cog wheel 35 and second cog wheel 34. The purpose of mechanism 50 is to utilize individually or in tandem (a) a sliding clutch and locking plate to temporarily disengage the equal driving relationship between both shaft 32 sides and terminate and lock the rate of rotation of central driver gear 29 where only the first stage product motivates transmission output. Therefore, the resulting higher torque will provide the effect of a low gear and/or (b) utilize a planetary rotary reduction mechanism to lower the rotational rate of one side of shaft 32 to reduce the rate of second stage multiplication during any phase of transmission operation for temporary increases in transmission output torque, providing the effect of a passing gear.

Shown in FIG. 5 is an alternate method of creating second stage multiplier conditioning gears. In this alternative, combination output receiving gear and first cog wheel ring gear 73 replaces output receiving gear 70 and first cog wheel 44. Second cog ring wheel 31 replaces second cog wheel 34. During operation of the alternative, fourth cog wheel 42 is driven by the combination wheel 73. The third cog wheel 36 is connected to the fourth cog wheel 42 through connecting axle 40 and drives second cog ring wheel 31 rigidly attached to drive shaft 32.

Shown in FIG. 3 is an alternative arrangement for operation of the transmission with the position for the first and second stage multipliers reversed. In this arrangement, motor power rotates input drive shaft 1 and rigidly attached central driver gear 29. Central driver gear 29 drives first satellite pinions 18 rigidly attached to couplers 22 to produce the first stage rotary multiplication product. This first stage rotational product is transferred to output receiving gear 70 through couplers 22 rotating through revolving sustaining disk 24. The first cog wheel 44, rigidly attached to the output receiving gear 70, drives fourth cog wheel 42 rigidly coupled to third cog wheel 36 with alternate drive shaft 33 mounted to the transmission in a manner permitting free rotation. Third cog wheel 36 drives second cog wheel 34 which is rigidly attached to main drive shaft 32. Main drive shaft 32 is mounted to the transmission in a manner permitting free rotation, and is rigidly connected to fifth cog wheel 35 which drives driving ring 16. Driving ring 16 drives first satellite pinions 18 concurrently with central driver gear 29 to produce the second stage of rotary multiplication. Thus, the couplers 22 transfer to the output receiving gear 70 a rotational output rate determined by the combined first and second stage rotary multiplication products. The output receiving gear 70 next produces through the fifth cog wheel 35, the main drive shaft 32, the second cog wheel 34, the third cog wheel 36, the alternate shaft 33, the fourth cog wheel 42, and the attached first cog wheel 44, the expanded second stage rotary multiplication product which establishes the rate of rotation and driving velocity for the driving ring 16 which, in addition to the central driver gear 29 concurrently drives the couplers 22 through their first satellite pinions 18. Thus also in this alternative, satellite pinions 18 serve as a common multiplicand for the first and second stage multipliers.

FIG. 9 shows the preferred method of incorporating a heavy duty reverse drive mechanism into the transmission. The reverse connecting shaft 62 is mounted to supporting framework. Reverse takeoff gear 60 is connected in a driven relationship to the third cog wheel 36 and attached to the second end of connecting shaft 62. Reverse idler gear 64 is attached to the first end of connecting shaft 62 and connected in a driving relationship to reverse driver 66. Reverse driver and an attached reverse driver coupling 68 freely rotate about shaft 32. Second cog wheel 34 and an attached second cog wheel coupler 69 are connected to third cog wheel 36 in a driven relationship and also freely rotate about shaft 32. Shaft 32 is separated into two sections between reverse driver 66 and second cog wheel 34. During forward actuation, mechanism 54 couples both sections of shaft 32 with second cog wheel coupler 69 and attached second cog wheel 34 for drive continuity. During reverse actuation, mechanism 54 releases second cog wheel coupling 69 and attached second cog wheel 34. Mechanism 54 next connects reverse driver coupling 68 and attached reverse driver 66 to the outer section of shaft 32 while concurrently locking the inner section of shaft 32. With the inner shaft 32 section locked into a non-rotating position, the second stage of the transmission is prevented from compounding first stage products. Wherein the third cog wheel 36 transfers to the outer output shaft section 32 a first stage reversed angular velocity through gear 60, connecting shaft 62, gears 64, 66 and coupling 68. This results in a slow, high torque reverse output suitable for heavy duty applications. Mechanism 54 further duplicates the functions of the mechanism 50 previously discussed during transmission operation.

FIG. 10 shows an alternate method of mounting a reverse drive mechanism to the transmission for light duty applications. The reverse drive connecting shaft 62 is mounted to supporting framework. Reverse takeoff gear 60 is connected in a driven relationship to the third cog wheel 36 and attached to the first end of connecting shaft 62. Reverse idler gear 64 is attached to the second end of connecting shaft 62 and connected in a driving relationship to reverse driver 66. Reverse driver 66 and attached reverse driver coupling 68 freely rotate about shaft 32. Shaft 32 is separated into two sections, an inner section supporting the second cog wheel 34 and an outer section supporting reverse driver 66. During forward actuation, mechanism 58 couples both the inner and the outer shaft 32 sections. During reverse actuation, mechanism 58 uncouples drive continuity of the two shaft 32 sections and locks reverse driver coupling 68 to the outer section of shaft 32. Wherein the third cog wheel 36 transfers to the output shaft a reversed angular velocity through gear 60, connecting shaft 62, gears 64, 66 and coupling 68. The transmission continues progressive compounding during actuation of this reverse mechanism which provides high speed reverse output capability for light duty and marine applications.

FIG. 11 shows a variation of a portion of the reverse drive mechanism of FIG. 10. This variation includes a second cog wheel coupler 69 attached to the second cog wheel 34 with both freely rotating about an undivided output shaft 32. During forward transmission operation, mechanism 59 engages second cog wheel coupler 69 with output shaft 32. During reverse transmission operation, mechanism 59 engages reverse driver coupling 68 with output shaft 32.

Lubrication of the transmission mechanism consists of a basic splash distributed level of replaceable gear oil within the transmission housing.

Detailed Description of the Three Stage Common Axis Transmission

Figure 12:
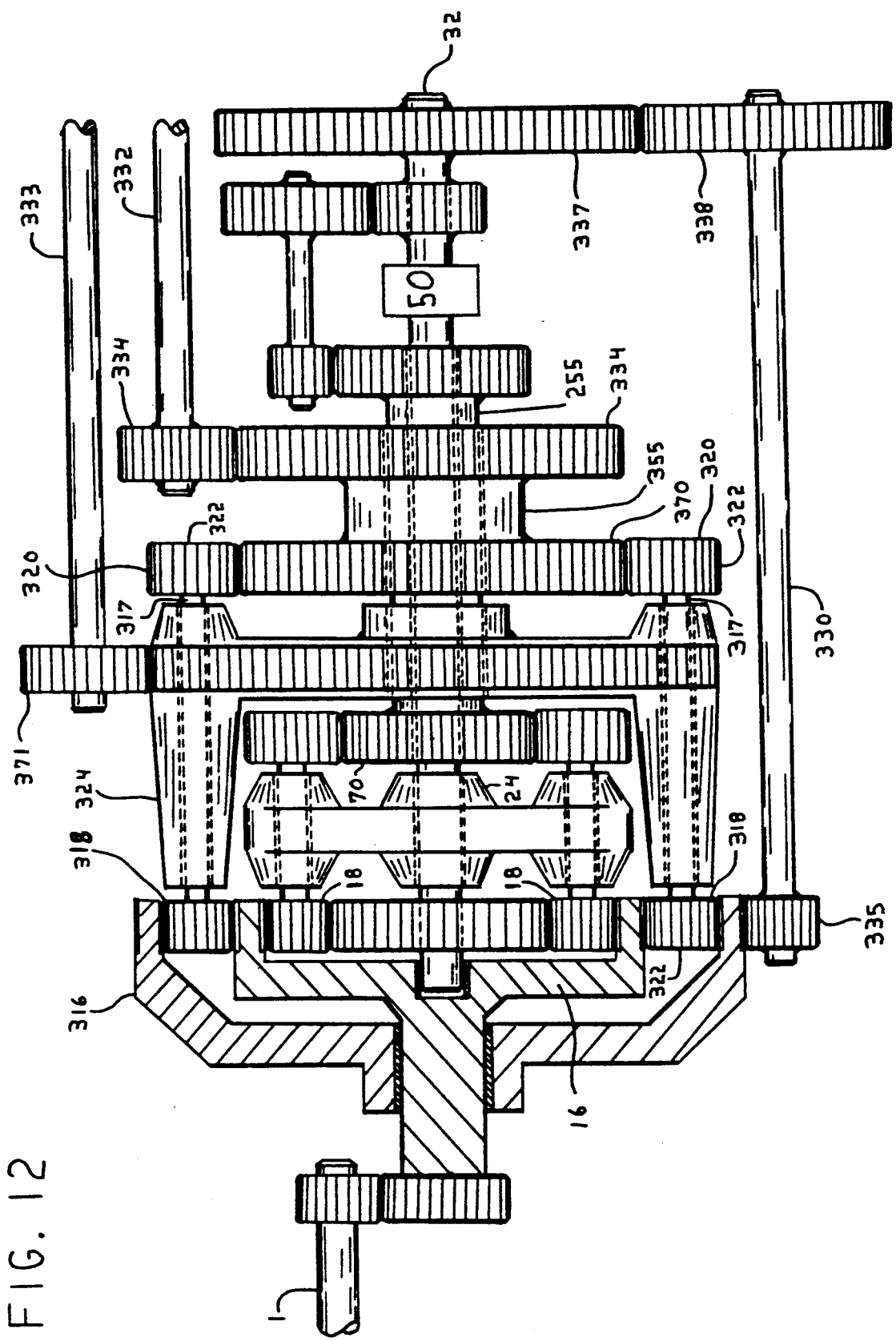
FIG. 12 shows the transmission of FIG. 1 modified to include a third stage of rotary multiplication.

FIG. 12 shows the transmission of FIG. 1 modified to include a second bidirectional driver producing a third stage of rotary multiplication. The product of this third stage is combined with the combinate products of the first two stages to create an enhanced exponential output of angular velocity.

During operation of this modification, the majority of the components of the two stage transmission of FIG. 1 continue to function as previously disclosed. A third stage driving ring 316 of FIG. 12 is mounted for free rotation about the lengthened connecting shaft of the first stage driving ring 16. The outer edge of the first stage driver ring 16 contains gear cogs which mesh with and drive third stage first satellite pinions 318. First satellite pinions 318 are attached to the first end of coupler shaft 317. Third stage second satellite pinions 320 are attached to the second end of coupler shafts 317. Shaft 317, pinions 318 and 320 combine to form third stage unitary couplers 322. Couplers 322 are mounted to, and rotate through the third stage sustaining disk 324. Sustaining disk 324 is mounted for free rotation about lengthened connecting ring 255. Second satellite pinions 320 are connected in a driving relation with the third stage output receiving gear 370. Output receiving gear 370 is attached to the third stage output driver gear 344 with connecting ring 355. Gears 344, 370 and connecting ring 355 share a contiguous bore for free rotation about connecting ring 255. Output driver gear 344 is connected in a driving relation with transmission output receiver gear 334. Output receiver gear 334 is attached to output shaft 332.

The first two transmission stages rotate shaft 32 in the manner previously disclosed. Shaft 32 rotates the third stage transfer gear 337 connected in a driving relation to the third stage transfer receiving gear 338. Third driver input gear 335 is connected in a driving relation with third stage driving ring 316 and connected to the first end of shaft 330. Receiving gear 338 is connected to the second end of shaft 330.

During the three stages of transmission operation, motor input rotates ring gear 16 to drive third stage first satellite pinions 318 concurrently with first stage first satellite pinions 18. Third stage ring gear 316 concurrently drives pinions 318 in the opposite direction with the combined velocity of the first and second transmission stages as modified by the ratios of gears 335, 338 and 337. This modification establishes the rate of progressive third stage compounding and the range of the enhanced final exponential output. The resulting combined three stage product drives the output shaft through gears 334, 344, 370 and 320. Unitary couplers 322 are free to concurrently orbit the central axis and transmit the combined three stage product to output receiving gear 370 when driven by differential driving velocities.

FIG. 12 further shows an enhanced speed frictionless clutch mechanism utilizing the third stage sustaining disk 324 as an output driver. Driver disk 324 meshes with and drives third stage clutch receiving gear 371 attached to clutch output shaft 333. During operation of the three stage frictionless clutch at motor idle speed, couplers 322 rotate, but do not orbit the central axis when bidirectionally driven with identical driving velocities. This results in no rotational clutch output. Further input increases above the motor idle speed result in progressive differential velocities driving couplers 322 and causing their concurrent orbiting and rotating. Progressive coupler orbiting increases the rotation rate of the third stage disk driver 324 and clutch receiving gear 371. This results in a progressively increasing rotary clutch output.

The mechanism of FIG. 12 can further be expanded to include additional stages of rotary multiplication with the addition of one or more ring drivers rotating upon the supporting shafts of previous stage ring drivers. Additional unitary couplers are mounted to additional sustaining disks rotating about lengthened connecting rings between the previous stage's output receiving gears and output drive gears. The additional ring drivers are driven from that stage's output driver gears by ring gear input driver gears attached to shafts which are coupled to output driver transmitting gears; wherein the the unitary couplers are bidirectionally driven by (a) the current stage ring driver and (b) the previous stage ring driver.

Detailed Description of the Idle Speed Compensating Mechanics

Figure 14:
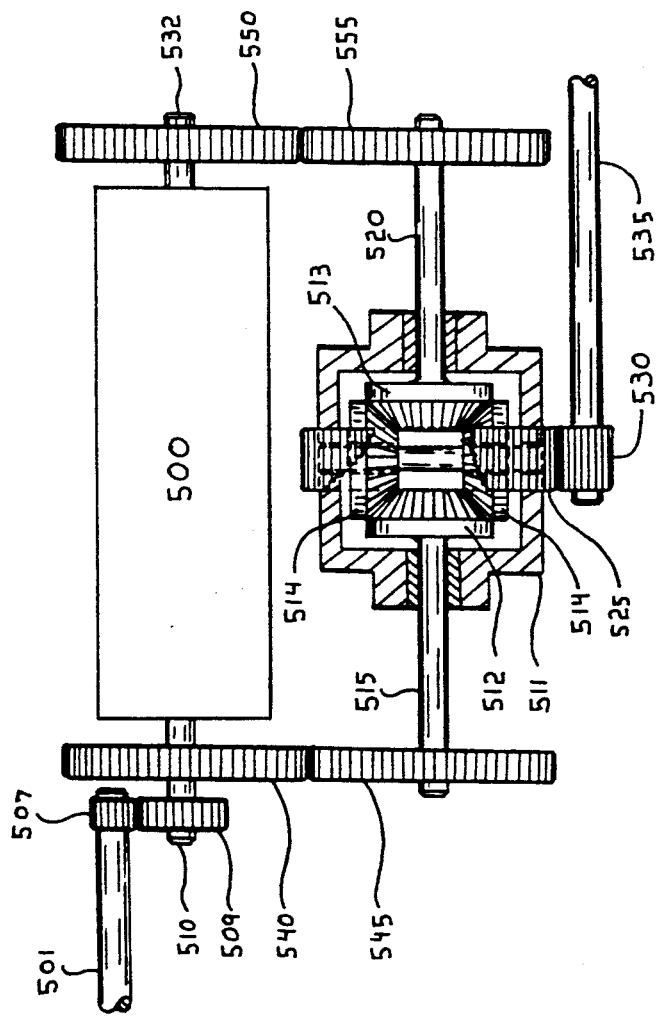
FIG. 14 shows a top view of an idle speed transmission compensating mechanism permitting the transmission to function concurrently as a torque converter.

FIG. 14 shows an interconnected transmission idle speed compensating mechanism which permits a differentially compounding transmission to further function as a torque converter with combustion engines requiring idle speeds during vehicular or machine operation. The mechanism allows the transmission to compensate for, and transmit no rotational output at motor idle speed while transmitting progressively accelerating output torque with motor input above the idle speed and throughout the entire vehicular or machine operational range. The compensating mechanism incorporates a differential gear mechanism 511 of FIG. 14. Two sources of rotational input are transmitted into differential 511. The first source is motor drive rotation transferred to the first element input shaft 515 from the transmission input shaft 510 by motor transfer driver gear 540 and motor transfer receiver gear 545. The second source is transmission output drive rotation transferred to the second element input shaft 520 from the transmission output shaft 532 by transmission transfer driver gear 550 and transmission transfer receiver gear 555.

Concurrent motor and transmission 500 operation at motor idle speed causes motor side gear 512 and transmission side gear 513 to counterrotate at identical speeds, resulting in the rotation and non-orbiting of spider gears 514. Motor acceleration beyond the idle speed results in additional transmission progressive compounding with output exceeding increases of motor input. This results in differential side gear counterrotation speeds with transmission side gear 513 exceeding the counterrotation rate of motor side gear 512. Spider gears 514 compensate for the differential rates by commencing orbiting of the differential central axis, rotating the differential supporting framework and attached differential third element output driver 525. Output driver 525 meshes with and drives output receiver 530 rigidly attached to output shaft 535. Output shaft 535 is rotatably mounted to supporting framework.

Figure 15:
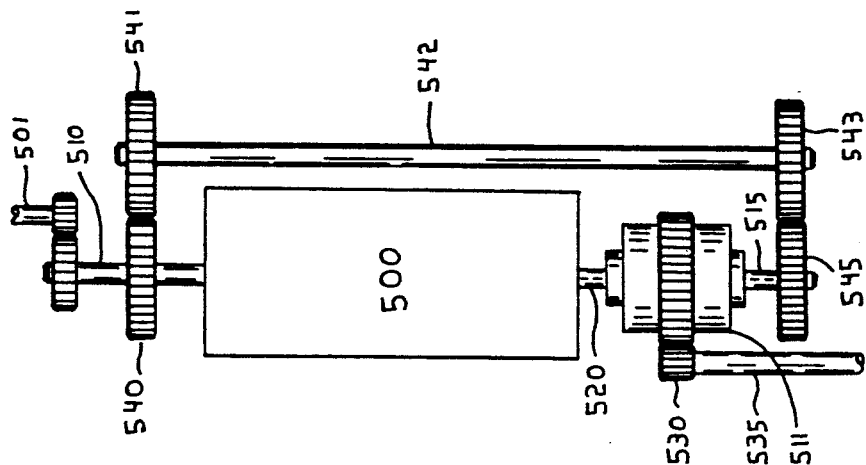
FIG. 15 shows an alternate arrangement for coupling the idle speed transmission compensating mechanism to the transmission.

FIG. 15 shows an alternate arrangement for interconnecting the idle speed compensating mechanism directly to the transmission 500. Second element input shaft 520 is coupled directly to the transmission 500 output shaft. First element input shaft 515 is connected to the transmission input shaft 510 through motor transfer driver gear 540, transfer shaft receiver 541, transfer shaft 542, transfer shaft transmitter gear 543 and motor transfer receiver gear 545. Transfer shaft 542 is rotatably mounted to supporting framework.

Figure 16:
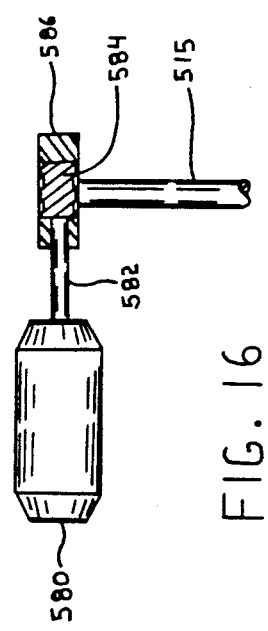
FIG. 16 shows an alternative method of compensating for motor idle speed utilizing an electric powered compensating mechanism.

FIG. 16 shows an alternative method of compensating for motor idle speed utilizing an electric powered compensating mechanism. Electric motor 580 provides angular velocity to rotate electric motor output shaft 582 and attached worm gear 584. Worm gear 584 meshes with and drives worm wheel 586. Worm wheel 586 is rigidly attached to compensating mechanism first element input shaft 515. During operation of the electric power compensating mechanism, the electric motor 580 drives the first element input shaft 515 at a rate equal to the counterrotating second element input shaft 520 to compensate for the motor idle speed and provide no differential third element output. The electric motor drive rate is reduced with driving velocities above motor idle speed to permit the differential drive transmitting of the full range of transmission output through the compensating mechanism. The use of the worm drive gear mechanism restricts the probability of transmission output driving the electric motor. Transmission 500 may consist of any exponentional transmission disclosed.

FIG. 17 shows an additional arrangement for interconnecting the idle speed compensating mechanism to the transmission 500. This alternative utilizes the drive rotation of the sustaining disk or ring 27 connected to drive the first element input shaft 515 of compensating differential 511. Second element input shaft 520 is coupled directly to the transmission output shaft. Sustaining disk or ring driver 27 is connected in a driving relation with sustaining disk or ring driver output gear 71. Output gear 71 is rigidly connected to the first end of transfer shaft 542. Transfer shaft transmitter gear 543 is rigidly connected to the second end of transfer shaft 542 and connected in a driving relation to idler gear 546. Idler gear 546 rotates about the idler shaft 547. Both the idler shaft 547 and the transfer shaft 542 are rotatably mounted to supporting framework. First element transfer receiving gear 545 is rigidly attached to first element input shaft 515 and is connected in a driven relation with idler gear 546.

During operation of this arrangement, low motor idler speed produces transmission mechanism operational speeds below the bidirectional equal driving velocity. This results with sustaining disk or ring driver 27 rotating in a first direction. This rotation is transferred to the differential compensating mechanism 511 through first element shaft 515 and utilized to compensate the low progressive compounding occurring at the idle speed which is driven through the transmission output shaft coupled to the second element input shaft 520. Progressive motor speeds above the transmission equal bidirectional driving velocity results with (a) the sustaining disk or ring driver 27 progressively reversing rotation to an accelerating second direction and (b) high progressively compounded transmission output. This results in the differential compensating mechanism progressively reducing and reversing the compensating of the motor idle speed. Full reversal results with compensating mechanism enhancement of output velocity with both the first element input shaft 515 and the second element input shaft 520 concurrently driving the third element output driver gear 525.

An advantage of this arrangement is that both the progressive compounding function of the transmission and the differential planetary movement of pinions and attached driver disk or ring are combined into one unit functioning as a transmission and a torque converting frictionless clutch.

Detailed Description of the Friction-Free Clutches

The frictionless clutch is a variation of the transmission mechanism which performs substantially different functions. These functions allow (a) the replacement of the conventional friction disk load severing/disengaging couplers (b) the use of this continuously engaged, all-geared mechanism to provide no rotative output at motor idle speed, but provide a progressively accelerating output with increasing motor speeds.

The use of the word "frictionless" implies the ability of the mechanism to perform the traditional clutch role of motivating a vehicle or machine drive from a stopped to a moving status, and back to the stopped position: (a) without impeding the ability of the engine to idle without load (b) without generating friction and (c) without disengaging the motor-clutch coupling. The term "frictionless" as utilized in this disclosure does not imply that there will be no normal friction from gear meshing or bearing resistance.

FIG. 4 shows the centrally bored sustaining driver disk 27 with attached couplers 22 utilized by the clutch mechanism. Driver disk 27 freely rotates about the main drive shaft, comprising gear cogs on the outer circumference and is connected in a driving relation with clutch output gear 71. Couplers 22, rotably mounted through sustaining driver disk 27, are connected in a driving relation with both the first stage driving ring 16 and the second driver gear 29. Clutch output gear 71 is rigidly connected to the alternate drive shaft 33 rotably mounted to supporting framework.

The frictionless clutch operates in a manner similar to that of the transmission by utilizing the bidirectionally driven mechanism to produce progressively expanded rotary products. This causes the driving velocity of the second stage central driver gear 29 of FIG. 1 to surpass the driving velocity of the first stage driving ring 16 of FIG. 1 with rotary input rates above motor idle speed. However, at idle speed, the two different size drivers rotate at different rates with the smaller driver exceeding the rate of the larger driver, but with both producing an identical driving velocity. Below idle speeds, the first stage driver produces a greater driving velocity since the differential compounding input into the second stage driver has not been expanded and accelerated for it to equal or exceed the velocity of the first stage. The sustaining disk driver 27 of FIG. 4 does not rotate at the motor idle speed, but initiates rotation with enhanced differential driving velocities. Couplers 22, rotating through the sustaining disk driver 27 of FIGS. 1 and 4, initiate orbiting the central axis to accomodate their differential driving rates. Sustaining disk driver 27 of FIG. 4 also concurrently initiates rotation. This actuates the clutching function by driving clutch output gear 71 of FIG. 4, rotating gear 71 and the attached alternate drive shaft 33. Alternate drive shaft 33 transfers rotary power to the vehicular transmission, or operational mechanism.

During input speeds below the idle speed, the second stage central driver gear 29 is uncoupled by the mechanism 50 allowing sustaining driver disk 27 to remain in a non-rotating and non-driving position. This allows for motor starting and stopping sequences to occur without motive output from the clutch mechanism.

The advantages of this arrangement include the creation of a durable and fully automatic clutching mechanism eliminating the need for a manual clutch engagement moment to facilitate motive actuation. The mechanism further eliminates the power loss and residual heat generation inherent in conventional friction clutches and fluid torque converters.

Detailed Description of the In-Line Radiant Clutch

The in-line radiant clutch is a variation of the frictionless clutch mechanism described in U.S. Pat. No. 4,700,589.

This improvement utilizes the double epicyclic gear train of the frictionless clutch to divide rotary motion into two stages to obtain differential products from each stage. These products result in concurrent twin stage bidirectional driving of geared couplers which rotate but do not orbit at motor idle speeds. With input rates above the motor idle speed, these couplers increase their individual rates of rotation and concurrently orbit the central axis of the mechanism.

The rotating couplers and their axles with attached output shaft all revolve around the central axis when orbiting to create the clutching actuation of the mechanism. The rotating output shafts transit through other working components also located at the central axis of the mechanism.

During operation, motor input rotates input shaft 201 and attached tributary 216 of FIG. 6. Engine tributary 216 is a crown gear plate or truncated bevel gear wheel which meshes with four receiving gears 218. The four truncated beveled receiving gears 218 are mounted to create an axis cruciform satellite orbit where the satellites rotate in harmony about their crossed individual axis of rotation. They are further capable of concurrently orbiting as a unit around their common cruciform axis. During clutch operation, the receiving gears 218 are driven by tributary 216 producing the first stage rotary product.

Attached to receiving gears 218 are transmitting shafts 222 which point inward towards the cruciform axis. Attached to the inner end of transmitting shafts 222 are truncated beveled pinion gears 220. Gears 218, shafts 222, and and gears 220 are joined to create united couplers 217 which are centrally bored for rotatable mounting upon coupler axles 284. Each coupler 217 has a centrally bored bearing ring spacer 226 attached to the outer end to facilitate rotation and prevent contact with sustaining ring 224. When couplers 217 are mounted for rotation (a) about coupler axles 284 of radiant transmitter 280 and (b) within sustaining ring 224, all couplers rotate in unison at the same rate when driven by tributary 216. Rotating couplers 217, sustaining ring 224, and coupler axles 284 are also capable of concurrently orbiting the central axis, rotating the output shaft 281 of the radiant transmitter 280. While this disclosure shows four couplers 217, the transmission will operate with from one to more than four couplers 217.

The purpose of couplers 217 are to transfer the combined products of both the first and second stages of rotary multiplication through the transmitting gears 220 to the output receiving gear 270. This output receiving gear 270 is attached to the first end of second stage conditioning coupler 282 of FIGS. 6 and 8. Both the transmitting gears 220 and the output receiving gear 270 are truncated beveled gears which mesh with one another to transfer the combined rotational product of the first and second stages to the reduction gear driver 234. Reduction gear driver 234 is attached to the second end of second stage conditioning coupler 282.

Coupler axles 284 are constructed with screw threads at each axle end. The purpose of these threads are to support sustaining ring mount locks 286 of FIG. 6 to lock sustaining ring 224 into position. The purpose of sustaining ring 224 is to provide correct spacing and structural support for couplers 217 to (a) rotate freely about their individual axis of rotation, and (b) to orbit as a unit around the central axis.

Reduction gear driver 234 meshes with and drives reduction gear receiver 236 attached to one end of shaft 240. Also attached to shaft 240 is the sliding shaft uncoupler 250. The purpose of shaft uncoupler 250 is to disengage the clutch mechanism for motor starting and stopping sequences to prevent undesired mechanism output and resulting vehicular or machine movement. Attached to the second end of shaft 240 is second stage tributary drive gear 242 which meshes with and drives second stage tributary receiving gear 244. Second stage tributary 229, coupler 246, and receiving gear 244 are joined to one another. This unitary coupler shares a central contiguous bore for free rotation about the conditioning coupler shaft 288 of the second stage conditioning unitary coupler 282. The resulting conditioning gear train consisting of gearing 220, 270, 234, 236, 242, 244, and 229 combine to create the multiplier for the second stage of rotary multiplication. The multiplicand of this second stage multiplier is again receiving gears 218 now driven in the opposite direction from the first stage driver. Receiving gears 218 combine this second stage product with that of the first stage to produce the sum of this common multiplicand.

During operation, the first stage tributary 216 and the second stage tributary 229 always drive receiving gears 218 in opposite directions. During the motor idle speed, the multiplication products of both the first and second stages are identical, resulting in both tributaries counterrotating at identical speeds. The result is couplers 217 rotating about their individual axis without orbiting the central axis. Therefore coupler axles 284 and attached output shaft 281 do not rotate, but remain in a stopped position preventing driven vehicular or machine movement. Increased motor input rates result in progressive recirculation and compounding of these first stage products by the second stage. This results in progressive and differential counterrotation rates between the first stage tributary 216 and the second stage tributary 229. This differential counterrotation causes couplers 217 to commence orbiting the central axis while concurrently increasing their individual rates of rotation. This progressive orbital action concurrently drives the radiant transmitter 280 consisting of coupler axles 284 and attached output shaft 281 to actuate the clutching mechanics of the mechanism.

The advantages of this arrangement include friction free automatic clutching by a mechanism with input and output drive shafts in-line with one another and located at the central axis of the mechanism. Such an arrangement will facilitate convenient mounting between power plants, transmission, or other output applications.

Detailed Description of the Dual Axis Three Stage Clutch and Transmission

Figure 13:
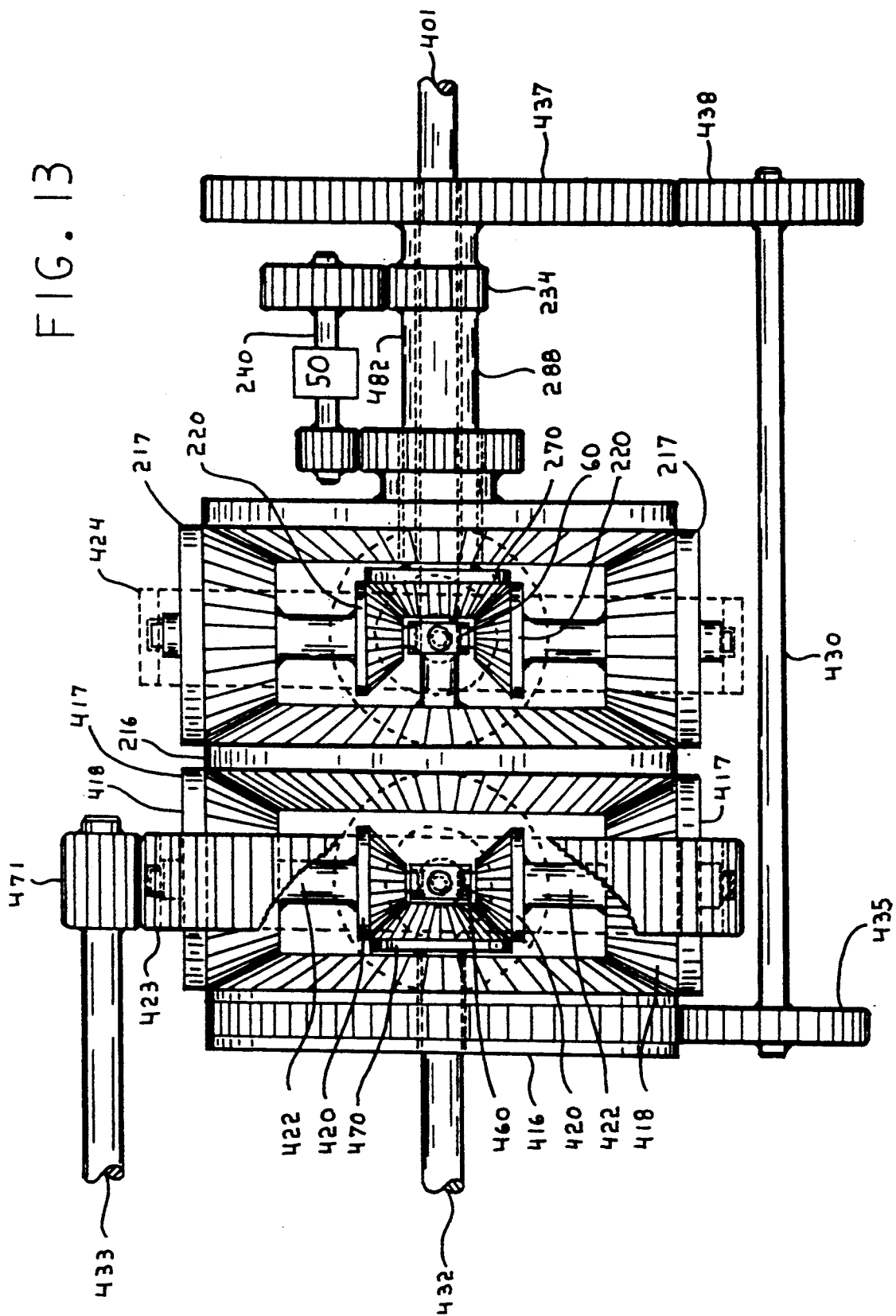
FIG. 13 shows a side view of a three stage radiant clutch mechanism and a three stage in-line radiant transmission.

FIG. 13 shows a radiant drive clutch further incorporating a third stage of rotary multiplication for enhanced friction free torque conversion and clutch actuation. The mechanism of FIG. 13 is further capable of being utilized as a three stage radiant drive transmission.

The mechanism of FIG. 13 utilizes the first and second stage bidirectional principles of the mechanism of FIG. 6 with certain modification. The interior ends of couplers 217 have pivot points which rotate within first and second stage hub bearing block 60. Hub bearing block 60 freely rotates about input shaft 401 and with couplers 217 as they orbit the central axis. The purpose of hub bearing block 60 is to provide correct spacing and positional support for the interior pivot points of rotating couplers 217.

Input shaft 401 freely transits through second stage conditioning coupler 482, hub bearing block 60 and is rigidly attached to the combined first stage driver gear 216. Combined first stage driver gear 216 is a double bevel gear wheel with geared driving surfaces on both sides. Rotational input from shaft 401 produces the first and second stage progressive compounding as previously disclosed. The resulting exponential output rotates transfer driver gear 437 attached to the end of second stage conditioning coupler 482. Transfer receiving gear 438 is connected in a driven relation with driver gear 437 and is rigidly attached to the second end of input driver shaft 430. Input driver shaft 430 is supportatively attached to supporting framework and has a first end rigidly attached to third stage input driver gear 435. Third stage driver gear 416 is a combination gear comprising a bevel gear wheel with a geared driving surface on one side and an additional geared driven surface located upon the outer circumferential edge of the wheel. Third stage driver gear 416 freely rotates about shaft 432 and is connected in a driven relation with third stage input driver 435.

The third stage first satellite pinions 418 are connected in a driven relation with both combined first stage driver gear 216 and third stage driver gear 416. Pinions 418 are further connected to the first end of connecting shafts 422. Third stage second satellite transmitting pinions 420 are connected to the second end of connecting shaft 422. Second satellite pinions 420 are further connected in a driving relation with third stage transmission output receiving gear 470. Output receiving gear 470 is rigidly attached to transmission output shaft 432.

Pinions 418, 420, and connecting shaft 422 combine to create third stage unified couplers 417. From the inner end of couplers 417 project pivot points which rotate within third stage hub bearing block 460. The purpose of hub bearing block 460 is to provide correct spacing and positional support for the interior pivots of rotating couplers 417. The exterior ends of couplers 417 contain spacers and pivot points. These pivot points rotate within the third stage sustaining ring driver 423. The purpose of ring driver 423 is to (a) provide correct spacing and structural support for the pivots of couplers 417 to rotate freely about their individual axis and (b) provide a clutch driving ring gear connected in a driving relation with third stage clutch output receiving gear 471. Clutch output receiving gear 471 is rigidly attached to clutch output shaft 433.

During operation of the third stage of the friction free clutch, motor input rotates input shaft 401 which drives combination first stage driver gear 216. This results in an exponential output from the first and second stages as previously disclosed. First and second stage progressive exponential output drives gears 437, 438, 435, and 416. Third stage driver gear 416 and combined first stage driver gear 216 both concurrently and bidirectionally drive couplers 417 through their first satellite pinions 418. At motor idle speed, both bidirectional drivers drive with equal velocities causing couplers 417 to rotate, but not orbit the central axis. This results in no rotation and the stopped position of sustaining ring driver 423, coupled output receiving gear 471, and attached clutch output shaft 433. Progressive differential bidirectional driving velocities from driver gears 216 and 416 cause couplers 417 to both rotate about their individual axis and initiate concurrent orbiting about the central axis. Progressive orbiting of couplers 417 causes progressive drive rotation of attached sustaining ring driver 423, driven clutch output receiving gear 471, and attached clutch output shaft 433. This actuates the clutching mechanism and provides motive output.

Attached to connecting shaft 240 is shaft uncoupler 50. The purpose of shaft uncoupler 50 is to disengage the clutch mechanism for motor starting and stopping sequences to prevent undesired mechanism output and resulting vehicular or machine movement.

FIG. 13 further shows the three stage in-line radiant drive mechanism modified as a transmission to produce and enhanced exponential output of angular velocity. During transmission operation, the couplers 417 drive third stage output receiving gear 470 rigidly connected to transmission output shaft 432, providing the transmission output.

The mechanism of FIG. 13 may further be modified to include a fourth stage of rotary multiplication: A second geared driving surface is located upon the third stage driver gear. The transmission output shaft is next connected to rotate a fourth driver gear to bidirectionally drive fourth stage couplers concurrently with the third stage driver gear.

It is the intention to cover all equivalents of the invention above described together with all modifications and variations thereof that are within the scope of the following claims.

The inventor Paul Kay Coronel claims:

1. A rotary motion transmission or clutch mechanism utilizing one continuously engaged gear train of interconnected individual solid gears to produce a user controllable gear ratio which infinitely varies the rotational shaft output to replace roles previously performed by manually or automatically actuated multiple gear ratio shifting mechanisms and/or friction inducing clutch mechanisms for motivation of slow, medium or high speed vehicles or machines between their minimum and maximum operational velocities, including: A transmission with a common component axis of rotation comprising:

(a) a driving ring which rotates about a central axis and has a central bore;

(b) at least one unitary coupler, each coupler including:
  (i) a satellite pinion with which the driving ring is connected in a driving relation to produce a first stage rotary multiplication product;
  (ii) a transmitting pinion gear rotating upon an axis parallel to that of the driving ring gear;
  (iii) a connecting shaft which at one end is rigidly connected to a second satellite pinion so that the coupler transmits rotary multiplication products;
(c) one centrally bored output receiving gear with which all the second satellite pinions are connected in driving relation, the output receiving gear rotating about the central axis;
(d) a centrally bored circular sustaining disk including equidistantly spaced bearing supports for the couplers, the connecting shaft of each coupler being rotatably connected to the disk through a bearing support; wherein each coupler can rotate about an axis of its own, and the circular sustaining disk and couplers are free to rotate about the central axis;
(e) a secondary driver gear rigidly connected at its central axis to the main drive shaft being rotatable around the central axis and connected in a driving relation to the first satellite pinions, and rotating within the driving ring;
(f) a first cog wheel integrally connected to the output receiving gear to rotate around the central axis, the first cog wheel having a central bore which is contiguous with the receiving gear bore;
(g) a main drive shaft supportively mounted to supporting framework which is rigidly connected to the secondary driver gear and freely rotating through and beyond the driving ring on one end, and on the other end freely rotating through the sustaining disk and the contiguous bores of the receiving gear and first cog wheel so that the sustaining disk and the receiving gear with the first cog wheel are free to rotate about the main drive shaft;
(h) a second cog wheel which is rigidly connected to the main drive shaft to rotate around the central axis;
(i) a third cog wheel which is connected in driving relation with the second cog wheel;
(j) a fourth cog wheel which is connected in driving relation with the first cog wheel; and
(k) a connecting axle which extends between the third and fourth cog wheels and which has ends which are rigidly connected to the third and fourth cog wheels, the connecting axle being parallel to the central axis and supportively mounted to a supporting framework; wherein the second satellite pinions transmit to the output receiving gear a rotational output rate determined by the first stage rotary multiplication product, and the output receiving gear producing through the main driveshaft, the second and third cog wheels, the connecting axle, and the fourth and first cog wheels a second stage rotary multiplication product which establishes the rate of rotation of the secondary driver gear which in addition to the driving ring, drives the coupler through their first satellite pinions.

2. The transmission as claimed in claim 1, further comprising:

(a) an input shaft rotating at the central axis and rigidly connected to the driver gear and freely rotating through the driving ring, sustaining disk, output receiving gear, and attached first cog wheel;
(b) at least one satellite pinion which the driving gear is connected in a driving relation to produce a first stage rotary multiplication product;
(c) a fourth cog wheel connected in a driving relation with the first cog wheel and rigidly attached to an alternate drive shaft;
(d) a third cog wheel rigidly attached to the alternate drive shaft;
(e) a second cog wheel rigidly attached to the main drive shaft, and connected in a driving relation with the third cog wheel;
(f) a fifth cog wheel rigidly attached to the main drive shaft, and connected in a driving relation with the driving ring; wherein the output receiving gear produces through the fifth cog wheel, the main drive shaft, the second cog wheel, the third cog wheel, the alternate shaft, the fourth cog wheel, and the first cog wheel to produce the second stage rotary multiplication product which establishes the rate of rotation for the driving ring, which in addition to the second driver gear, concurrently drives the first satellite pinions.

3. The transmission of claim 1 modified as a friction-free torque converter/clutching mechanism, comprising:

(a) a driving ring which rotates about a central axis and has a central bore;
(b) at least one unitary coupler, each coupler including:
  (i) a satellite pinion with which the driving ring is connected in a driving relation to produce a first stage rotary multiplication product;
  (ii) a transmitting pinion gear rotating upon an axis parallel to to that of the driving ring gear;
  (iii) a connecting shaft which at one end is rigidly connected to the satellite pinion and at another end is rigidly connected to a second satellite pinion so that the coupler transmits rotary multiplication products;
(c) one centrally bored output receiving gear with which all the second satellite pinions are connected in driving relation, the output receiving gear rotating about the central axis;
(d) a centrally bored circular sustaining disk driver cog wheel including equidistantly spaced bearing supports for the couplers, the connecting shaft of each coupler being rotatably connected to the disk through a bearing support; wherein each coupler can rotate about an axis of its own, and the circular sustaining disk and couplers are free to rotate about the central axis;
(e) a secondary driver gear rigidly connected at its central axis to the main drive shaft being rotatable around the central axis and connected in a driving relation to the first satellite pinions, and rotating within the driving ring;
(f) A first cog wheel integrally connected to the output receiving gear to rotate around the central axis, the first cog wheel having a central bore which is contiguous with the receiving gear bore;
(g) a main drive shaft supportively mounted to supporting framework which is rigidly connected to the secondary driver gear and freely rotating through and beyond the driving ring on one end, and on the other end freely rotating through the sustaining disk and the contiguous bores of the receiving gear and first cog wheel so that the sustaining disk and the receiving gear with the first cog wheel are free to rotate about the main drive shaft;

(h) a rotating output drive shaft with an axis parallel to the central axis, and mounted to supporting framework;

(i) a sustaining disk driver output receiving gear rigidly attached to the output drive shaft, and connected in a driving relation to the sustaining disk driver cog wheel;

(j) a second cog wheel which is rigidly connected to the main drive shaft to rotate around the central axis;

(k) a third cog wheel which is connected in driving relation with the second cog wheel;

(l) a fourth cog wheel which is connected in driving relation with the first cog wheel;

(m) a means for uncoupling the second stage driver gear; wherein motor starting or stopping does not rotate the output drive shaft;

(n) a connecting axle which extends between the third and fourth cog wheels and which has ends which are rigidly connected to the third and fourth cog wheels, the connecting axle being parallel to the central axis and supportively mounted to a supporting framework; wherein the second satellite pinions transmit to the output receiving gear a rotational output rate determined by the first stage rotary multiplication product, and the output receiving gear producing through the main driveshaft, the second and third cog wheels, the connecting axle, and the fourth and first cog wheels a second stage rotary multiplication product which establishes the rate of rotation of the secondary driver which in addition to the driving ring, drives the couplers through their first satellite pinions, wherein a certain driving ring/secondary driver gear counterrotation rate causes no rotation of the sustaining disk driver cog wheel, output receiving gear, or output drive shaft, while progressive differential driving of the driving ring/secondary driver gear causes progressive drive rotation of the output receiving gear and attached output drive shaft by the sustaining disk driver cog wheel.

4. A friction free torque converter/clutching mechanism as claimed in claim 3 with a dual component axis of rotation comprising:

(a) an initial crown plate which rotates about a central axis having an input drive shaft attached thereto;

(b) at least one centrally bored unitary coupler, each coupler including:
(i) a satellite pinion with which the initial crown plate is connected in a driving relation to produce a first stage rotary multiplication product;
(ii) a beveled pinion transmitting gear; and
(iii) a connecting shaft which at one end is rigidly connected to the satellite pinion and at another end is rigidly connected to the beveled pinion transmitting gear so that the coupler transmits the first stage rotary multiplication product and rotates upon a coupler axle connected to the output shaft;

(c) a centrally bored second stage conditioning coupler which at one end has an attached output receiving gear with which all the beveled pinion transmitting gears are connected in driving relation, the coupler extending through and beyond the contiguous central bore of the secondary crown plate and the first cog wheel;

(d) a circular retaining ring including equidistantly spaced mounting holes for the coupler axles, each coupler axle being securely connected to the ring through the mounting hole;

(e) a rotating radiant transmitter having coupler axles attached to an output shaft, the coupler axles having threaded ends to attach retaining ring screw locks, and the output shaft extending through and beyond the centrally bored second stage conditioning coupler and located parallel to the central axis;

(f) a secondary crown plate having a central bore, the secondary crown plate being rotatable around the central axis and being connected in a driving relation to the satellite pinions in mirror image relation to the initial crown plate;

(g) a first cog wheel integrally connected to the secondary crown plate to rotate around the central axis, the first cog wheel having a central bore which is contiguous with the secondary crown plate bore;

(h) a second cog wheel which is rigidly connected to the second end of the conditioning coupler shaft to rotate around the central axis;

(i) a third cog wheel which is connected in a driving relation with the second cog wheel;

(j) a fourth cog wheel which is connected in a driving relation with the first cog wheel;

(k) a connecting axle which extends between the third and fourth cog wheels which has ends that are rigidly connected to the third and fourth cog wheels, the connecting axle being parallel to the central axis and supportatively mounted to supporting framework; wherein the beveled pinion transmitting gears transmit to the output receiving gears a rotational output rate determined by the first stage rotary multiplication product, and the output receiving gear producing throught he conditioning coupler shaft, the second and third cog wheels, the connecting axle, and the fourth and first cog wheels a second stage rotary multiplication product which establishes the rate of rotation of the secondary crown plate which in addition to the initial crown plate, drives the couplers through their satellite pinions; and (l) an uncoupling mechanism located upon the connecting axle between the third and fourth cog wheels to separate the axle sections and permit free rotation of the secondary crown plate and disengagement of the clutching mechanism.

5. The transmission as claimed in claim 1 further comprising an alternate method for driving the second stage multiplication gears, including:

(a) a combination output receiving gear and first cog wheel ring gear;

(b) a second cog ring wheel; wherein the fourth cog wheel in connected in a driven relation with the combination output receiving gear and first cog wheel, and the second cog ring wheel is connected in a driven relation with the third cog wheel.

6. The transmission as claimed in claim 1 further comprising a selective planetary geared rotation reduction means attached to the connecting axle; wherein one connecting axle section rotates at a slower rate than the second axle section to increase transmission output torque producing a step-down or passing-gear effect.

7. The transmission as claimed in claim 1 further comprising a selective means to disengage and lock one connecting axle section; wherein one connecting axle section is separated and locked to prevent its rotation and second stage driving while the second connecting axle section is free to rotate, increasing transmission output torque producing a step-down or passing gear effect.

8. The transmission as claimed in claim 1 with a reversing mechanism where a third cog wheel drives a reverse takeoff cog wheel attached to the second end of a connecting shaft, the connecting shaft being mounted to supporting framework with a reverse idler cog wheel attached to the first end, the reverse idler cog wheel connected in a driving relationship with a reverse driver cogwheel, and output drive shaft divided into two sections between the reverse driver coupling and the second cog wheel coupling, the reverse driver and an attached reverse driver coupling freely rotating about the inner section of the drive shaft, the second cog wheel and an attached second cog wheel coupling freely rotating about the outer section of the drive shaft, where an actuating mechanism couples both drive shaft sections and the second cog wheel coupling during forward transmission operation, and the actuation mechanism couples the reverse driver coupling to the outer driveshaft section while locking the inner driveshaft section to a non-rotating position during reverse operation.

9. The transmission as claimed in claim 1 with a reversing mechanism where a third cog wheel drives a reverse takeoff cog wheel connected to a reverse idler cog wheel with a connecting shaft, the shaft being mounted to supporting framework, the reverse driver cog wheel connected in a driven relationship with the reverse idler cog wheel, an output shaft divided into an inner section and an outer section, the reverse driver cog wheel and attached reverse driver coupling freely rotating about the outer output shaft section, the actuation mechanism connecting both shaft sections during forward transmission operation, and the actuating mechanism uncoupling the drive continuity of the two output shaft sections and locking the reverse driver coupling to the outer output shaft section during reverse transmission operation.

10. The transmission as claimed in claim 9 where a second cog wheel coupler is attached to the second cog wheel, and both second cog wheel and attached coupler freely rotate about the driveshaft, and the driveshaft remains undivided, the actuation mechanism engaging the second cog wheel coupler during forward transmission operation, and the actuation mechanism engaging the reverse driver coupling during reverse transmission operation.

11. The transmission as claimed in claim 1 further comprising a third stage of rotary multiplication including:
(a) a second driving ring rotating about the (1) central axis and (2) the supporting shaft of the first driving ring;
(b) at least one third stage unitary coupler, each coupler including:
 (i) a satellite pinion with which the second driving ring is connected in a driving relation to produce a third stage rotary multiplication product;
 (ii) a transmitting pinion gear rotating upon an axis parallel to that of the second driving ring gear;
 (iii) a connecting shaft which at one end is rigidly connected to the satellite pinion, and at another end is rigidly connected to a second satellite pinion so that the coupler transmits rotary multiplication products;
(c) one centrally bored output receiving gear with which all the second satellite pinions are connected in driving relation, the output receiving gear rotating about the (1) central axis and (2) around the second stage output receiving gear connecting ring;
(d) a centrally bored circular sustaining disk including equidistantly spaced bearing supports for the couplers; the connecting shaft of each coupler being rotatably connected to the disk through a bearing support; wherein each coupler rotates about an axis of its own, and the circular sustaining disk with the couplers are free to rotate about the central axis; the sustaining disk further rotating about the second stage output receiving gear connecting ring;
(e) the first driving ring of the transmission connected in a driving relation with the third stage satellite pinion;
(f) an output receiving gear attached to, and sharing a contiguous bore with (1) a connecting ring and (2) the output transmitting gear, with all rotating about the second stage connecting ring; the output receiving gear further connected in a driven relation to the second satellite pinion;
(g) a transmission output receiving gear attached to an output shaft rotatably mounted to supporting framework;
(h) a transfer driver gear attached to the central driveshaft of the transmission and connected in a driving relation with the transfer receiving gear;
(i) a connecting shaft rotatably attached to supporting framework and at one end rigidly connected to the transfer receiving gear; and at another end rigidly connected to the third stage input driver gear; wherein the transfer driver gear, transfer receiver gear, input driver shaft, input driver gear and third stage driving ring gear transmit the combined first and second stage rotating product to the third stage satellite pinion; and the second satellite pinion transmits to the output receiving gear a third stage rotational output rate determined by the compounding of the first and second stage combinate product combined with the product of the first stage ring gear and the third stage satellite pinion.

12. A friction free torque converter/clutching mechanism with a third stage of rotary multiplication utilizing the mechanism claimed in claim 11, further comprising:
(a) a third stage sustaining disk driver gear connected in a driving relation to a third stage clutch output receiving gear;
(b) an output shaft rotatably attached to supporting framework and rigidly attached to the clutch output receiving gear; wherein identical first and second driving ring bidirectional driving velocities cause the third stage unitary couplers to rotate and not orbit, maintaining the sustaining disk, output receiving gear, and attached shaft in a non-rotating position; while progressive first and second driving ring differential bidirectional driving velocities cause progressive orbiting of the couplers, and progressive rotation of the sustaining disk driver gear, resulting with the progressively driven rotation of the clutch receiving gear and attached shaft.

13. The transmission of claim 1 further including a torque converting idle speed transmission compensating mechanism interconnected with the transmission, comprising a geared differential with:
   (a) a means to transfer motor velocity from the transmission input shaft to the differential first element input shaft, including:
      (i) a motor transfer driver gear rigidly attached to the transmission input shaft;
      (ii) a motor transfer receiver gear rigidly attached to the first element input shaft and connected in a driven relation to the motor transfer driver gear;
   (b) a means to transfer transmission output velocity from the transmission output shaft to the differential second element input shaft, including:
      (i) a transmission transfer driver gear rigidly attached to the transmission output shaft;
      (ii) a transmission transfer receiver gear rigidly attached to the second element input shaft and connected in a driven relation to the transmission transfer driver gear;
   (c) a differential third element output driver gear attached to the supporting framework and connected in a driving relation to a third element output receiver gear;
   (d) a third element output drive shaft rigidly connected to the third element output receiver gear; wherein equal first and second element shaft counterrotation rates cause no drive rotation of the third element output driver, receiving gear or attached shaft and progressive differential first and second element shaft counterrotation rates cause progressive drive rotation of the third element output driver, receiving gear and attached shaft.

14. The transmission with the interconnected compensating mechanism of claim 13 modified to include:
   (a) a differential second element input shaft coupled to the transmission output shaft;
   (b) a gear train connecting the transmission input shaft to the differential first element input shaft including:
      (i) a motor transfer driver gear rigidly attached to the transmission input shaft;
      (ii) a transfer shaft receiver gear rigidly attached to one end of a transfer shaft and connected in a driven relation to the transfer driver gear;
      (iii) a transfer shaft transmitter gear rigidly attached to another end of a transfer shaft;
      (iv) a motor transfer receiver gear rigidly attached to the first element input shaft and connected in a driven relation to the transfer shaft transmitter gear; wherein the direct coupled transmission output shaft rotates the first element input shaft and the motor input shaft counterrotates the second element input shaft.

15. The transmission as claimed in claim 14 modified to include an electric powered idle speed compensating mechanism comprising:
   (a) an electric motor with an output shaft rigidly attached to a worm drive gear;
   (b) a worm drive wheel connected in a driven relation to the worm drive gear and rigidly attached to the differential first element input shaft; wherein electric motor drive rotation into the differential first element shaft compensates for transmission counterrotation input into the differential second element input shaft causing no rotation of the differential third element output driver gear; and transmission output drive rotation of the second element shaft with reduced or no electric motor drive rotation of the first element shaft causes differential third element output driver gear to rotate and drive the output receiver gear and attached output shaft.

16. The transmission with the interconnected idle speed compensating mechanism of claim 14 modified to utilize driven velocity from the sustaining disk or ring gear to compensate motor idle speed rotation, including:
   (a) a means to transfer angular velocity from the sustaining disk or ring driver to the compensating differential input shaft, including:
      (i) a sustaining disk or ring driver output gear connected in a driven relation to the sustaining disk or ring driver;
      (ii) a transfer shaft rigidly connected on one end to the sustaining disk or ring output driver gear and on another end rigidly connected to a transfer shaft transmitting gear; the shaft further rotatably mounted to supporting framework;
      (iii) an idler gear rotating about an idler shaft and connected in a driven relation to the transfer shaft transmitting gear; the idler shaft being mounted to supporting framework;
      (iv) a first element transfer receiving gear rigidly attached to a compensating differential first element input shaft and connected in a driven relation to the idler gear;
   (b) a compensating differential second element input shaft coupled to the transmission output shaft; wherein low motor idle speed producing low transmission output concurrently produces sustaining disk or ring rotation in a first direction to rotate first element shaft to compensate for the motor idle speed velocity produced through the second element shaft resulting in no third element drive rotation, and higher motor speeds progressively reverses sustaining disk or ring rotation to a second direction resulting in a progressive reversal of motor speed compensating and the progressive enhancement of the third element driving velocity.

* * * * *